United States Patent
El-Ouardi et al.

(10) Patent No.: US 10,963,050 B2
(45) Date of Patent: Mar. 30, 2021

(54) DEVICE AND METHOD FOR CONTROLLING A MOTOR VEHICLE

(71) Applicant: DAV, Créteil (FR)

(72) Inventors: Nour-Eddine El-Ouardi, Créteil (FR); Stéphanie Dabic, Créteil (FR)

(73) Assignee: DAV, Créteil (FR)

(*) Notice: Subject to any disclaimer, the term of this patent is extended or adjusted under 35 U.S.C. 154(b) by 11 days.

(21) Appl. No.: 15/515,361

(22) PCT Filed: Oct. 2, 2015

(86) PCT No.: PCT/FR2015/052657
§ 371 (c)(1),
(2) Date: Mar. 29, 2017

(87) PCT Pub. No.: WO2016/051116
PCT Pub. Date: Apr. 7, 2016

(65) Prior Publication Data
US 2017/0235368 A1    Aug. 17, 2017

(30) Foreign Application Priority Data

Oct. 2, 2014 (FR) .................................... 1459458

(51) Int. Cl.
*G06F 3/01* (2006.01)
*G06F 3/16* (2006.01)
(Continued)

(52) U.S. Cl.
CPC ............. *G06F 3/016* (2013.01); *B60K 35/00* (2013.01); *B60K 37/06* (2013.01); *B60Q 9/00* (2013.01);
(Continued)

(58) Field of Classification Search
CPC ...... G06F 3/016; G06F 3/0416; G06F 3/0488; B60K 35/00
See application file for complete search history.

(56) References Cited

U.S. PATENT DOCUMENTS 8,362,882 B2 * 1/2013 Heubel ............... G06F 3/04886
340/407.1
8,659,555 B2 * 2/2014 Pihlaja .................... G06F 3/016
345/173
(Continued)

OTHER PUBLICATIONS

International Search Report issued in corresponding application No. PCT/FR2015/052657 dated Dec. 17, 2015 (6 pages).
(Continued)

*Primary Examiner* — Benyam Ketema
(74) *Attorney, Agent, or Firm* — Osha Bergman Watanabe & Burton LLP

(57) ABSTRACT

The invention relates to a motor vehicle control device comprising: a touch surface (2) for detecting contact from a finger of a user and locating the contact on the touch surface (2); and a haptic and/or audio feedback module (4) configured such as to cause the touch surface (2) to vibrate and/or such as to generate audio feedback to the user, in response to contact with the touch surface (2), characterized in that said motor vehicle control device comprises a control unit (5) configured such as to control the haptic and/or audio feedback module (4) such that the value of at least one parameter of the haptic and/or audio feedback depends on the distance (D) between the location (P1) of the finger of the user and a target area (Zc) for controlling the touch surface (2). The invention also relates to a control method.

8 Claims, 1 Drawing Sheet

(51) Int. Cl.
    *G06F 3/0488*     (2013.01)
    *B60K 35/00*     (2006.01)
    *B60K 37/06*     (2006.01)
    *B60Q 9/00*     (2006.01)
    *G06F 3/041*     (2006.01)

(52) U.S. Cl.
    CPC .......... *G06F 3/0416* (2013.01); *G06F 3/0488* (2013.01); *G06F 3/167* (2013.01); *B60K 2370/1438* (2019.05); *B60K 2370/157* (2019.05); *B60K 2370/158* (2019.05); *G06F 2203/014* (2013.01)

(56) References Cited

U.S. PATENT DOCUMENTS

| | | | | |
|---|---|---|---|---|
| 8,686,952 | B2* | 4/2014 | Burrough | G06F 3/016 345/156 |
| 9,056,549 | B2* | 6/2015 | Pala | B60K 35/00 |
| 9,110,571 | B2* | 8/2015 | Ninomiya | G06F 3/016 |
| 10,191,547 | B2* | 1/2019 | Kuwabara | G06F 3/041 |
| 2005/0024342 | A1* | 2/2005 | Young | B60K 35/00 345/173 |
| 2005/0225539 | A1* | 10/2005 | Prados | B60K 35/00 345/173 |
| 2007/0146341 | A1* | 6/2007 | Medler | G06F 3/04847 345/173 |
| 2009/0219252 | A1 | 9/2009 | Jarventie et al. | |
| 2010/0156818 | A1 | 6/2010 | Burrough et al. | |
| 2011/0291954 | A1* | 12/2011 | Djavaherian | G06F 3/016 345/173 |
| 2012/0154315 | A1* | 6/2012 | Aono | G06F 3/016 345/173 |
| 2012/0169620 | A1 | 7/2012 | Bowler, II | |
| 2013/0246965 | A1* | 9/2013 | Ninomiya | G06F 3/0481 715/781 |
| 2014/0292706 | A1* | 10/2014 | Hunt | G06F 3/016 345/174 |
| 2016/0077588 | A1* | 3/2016 | Adams | B60K 35/00 345/174 |

OTHER PUBLICATIONS

Written Opinion of the International Searching Authority issued in corresponding application No. PCT/FR2015/052657 dated Dec. 17, 2015 (5 pages).

* cited by examiner

DEVICE AND METHOD FOR CONTROLLING A MOTOR VEHICLE

The present invention relates to a device and method for controlling a motor vehicle.

In recent years, cars have become easy to handle with the appearance of new emergent technologies (for example, assisted steering, ABS, speed regulator, reversing radar, etc.). Paradoxically however, the number of functions to be controlled while driving has also increased considerably. That can lead to a certain complexity associated with the poor knowledge of the use of these functionalities and their diversity. The car has become a true living space, perceived as a personal and interconnected communication centre: with, for example, the MP3 player, GPS, connection with cell phones.

The introduction of these new functions is reflected by an increase in the number of buttons on the dashboard of a car interior. However, the number of buttons cannot be increased ad infinitum, particularly because of the resulting complexity, the limited space, the accessibility or the cognitive load. Furthermore, the interaction of the driver with the systems embedded in the car can reproduce a situation of attention overload in which the driver cannot best deal with all the information concerning the task of driving, that being reflected by errors and longer detection times.

One possibility is to centralize the buttons by replacing them with a touchscreen. This makes it possible to continue to increase the number of the functions, the latter becoming programmable and reconfigurable and displayed temporarily or permanently depending on the context or the function activated. The screen thus includes a multifunctionality capability, while dematerializing the buttons and being customizable. Furthermore, the screens have three other major advantages: they allow on the one hand a direct interaction (the colocation of the display and input), and on the other hand they are versatile (the display can be easily configured for a certain number of functions), and finally they are intuitive (interaction method that is familiar, such as a "pointer" for example).

However, contrary to the case of a pushbutton, when the driver interacts with the touchscreen, he or she does not receive any feedback linked directly to his or her action on the interface, other than the simple contact of his or her finger rubbing on the screen.

In order to compensate for the loss of information caused by the replacement of conventional mechanical interfaces by touchscreens, provision is made for feedback, such as haptic feedback, to be added to provide the user with feedback from the system. This feedback makes it possible to avoid the possible ambiguity concerning the recognition of the action of the user by the system, which can favour the occurrence of hazardous situations. It must however also avoid overloading the visual and auditory pathways already highly stressed by the task of driving. In effect, the use of touchscreens in a motor vehicle must not divert the attention of the driver.

One aim of the present invention is to provide a control device and a method for controlling said control device, which does not hamper the driving, which is well perceived and appreciated by the users, and which can be discriminated from the other signals for a touchscreen application that observes motor vehicle constraints.

To this end, the subject of the present invention is a control device for a motor vehicle comprising:

a touch surface intended to detect a contact of a finger of a user and the location of the contact on the touch surface, and a haptic and/or audio feedback module configured to make the touch surface vibrate and/or to generate audio feedback to the user, in response to a contact on the touch surface, characterized in that it comprises a driver unit configured to drive the haptic and/or audio feedback module such that the value of at least one parameter of the haptic and/or audio feedback depends on the distance between the location of the finger of the user and a target control zone of the touch surface.

The haptic and/or audio feedback is thus used to guide the user in searching for the target zone, which makes it possible to avoid having the user divert his or her gaze from the road and which simplifies the identification thereof on the touch surface when driving at night.

According to one or more features of the control device, taken alone or in combination, the more said distance decreases, the more the value of at least one parameter of the haptic feedback increases, the value of at least one parameter changes according to a relationship dependent on said distance, such as a linear relationship, the value of at least one parameter varies by levels, the touch surface comprises a plurality of zones in strips surrounding the target control zone and in which a haptic and/or audio feedback is generated and the value of at least one parameter of the haptic and/or audio feedback generated is associated with a respective strip, the touch surface comprises at least one corridor zone in which a haptic feedback is generated, directed toward the target control zone, the touch surface comprises four corridors converging toward the target control zone and spaced apart from one another by 90°, a parameter of the audio feedback is chosen from the intensity of the volume, the phase, the frequency, the duration, the duration between two identical signals and/or a parameter of the haptic feedback is chosen from the intensity of the acceleration, the frequency, the amplitude, the duration, the duration between two identical signals, the phase.

Another subject of the present invention is a method for controlling a control device for a motor vehicle as described previously, characterized in that it comprises the following steps:

a contact of a finger of a user and the location of the contact on the touch surface are detected, and a haptic and/or audio feedback is generated of which the value of at least one parameter of the haptic and/or audio feedback depends on the distance between the location of the finger of the user and a target control zone of the touch surface.

According to one or more features of the control method, taken alone or in combination, the more said distance decreases, the more the value of at least one parameter of the haptic feedback increases, the value of at least one parameter changes according to a relationship dependent on said distance, such as a linear relationship, the value of at least one parameter varies by levels, the touch surface comprises a plurality of zones in strips surrounding the target control zone and in which a haptic and/or audio feedback is generated and the value of at least one parameter of the haptic and/or audio feedback generated is associated with a respective strip, the touch surface comprises at least one corridor zone in which a haptic feedback is generated, directed toward the target control zone.

BRIEF DESCRIPTION OF THE DRAWINGS

Other advantages and features will emerge on reading the description of the invention, and the attached figures which represent a non-limiting exemplary embodiment of the invention and in which.

In these figures, identical elements bear the same reference numbers.

DETAILED DESCRIPTION

Figure 1:
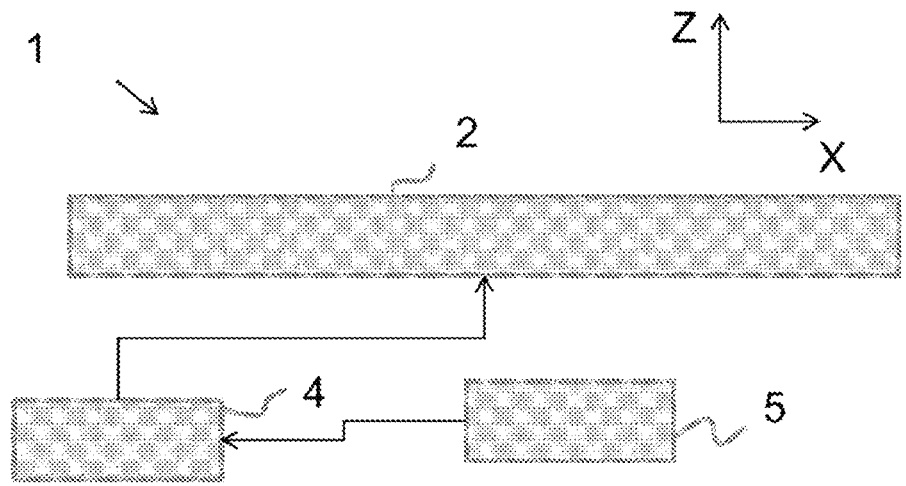
FIG. 1 represents an example of a control device for a motor vehicle.

FIG. 1 represents a motor vehicle control device 1.

The control device 1 comprises a touch surface 2 and a haptic and/or audio feedback module 4.

The touch surface 2 is intended to detect a contact of a finger of a user and the movement of the finger over the touch surface 2.

The haptic and/or audio feedback module 4 is configured to make the touch surface vibrate in response to a contact on the touch surface 2 by a finger or any other activation means (for example a stylus) of a user having for example modified or selected a command and/or to generate an audio feedback to the user in response to a contact on the touch surface 2.

"Haptic" describes a feedback by touch. Thus, the haptic feedback is a vibratory or vibrotactile signal.

The control device 1 can comprise a display device arranged under the touch surface 2 to display images through the touch surface 2, which is then transparent, thus forming a touchscreen.

A touchscreen is an input peripheral device enabling the users of a system to interact therewith by virtue of touch. It allows the direct interaction of the user on the zone that he or she wants to select for various uses such as, for example, the selection of a destination address or of a name in a directory, the settings of the air condition system, the activation of a dedicated function, the selection of a track from a list, or, generally, scrolling through a list of choices, selection, validation, and errors.

The touch surface 2 comprises a plate bearing a contact sensor for detecting a push pressure or a movement of the finger or of a stylus of the user.

The contact sensor is for example a pressure sensor, typically using the FSR (Force Sensing Resistor) technology, that is to say using pressure-sensitive resistors. The FSR technology exhibits a very good strength and robustness, while having a high resolution. Furthermore, it is highly reactive and accurate, while being relatively stable over time. It can have a fairly long life, and can be used with any type of activation means, at a relatively low cost.

According to one design of the FSR technology, the sensor operates by placing two conductive layers in contact for example by the action of the finger. One of the embodiments consists in covering a glass plate with a layer of conductive ink, on which is superposed a sheet of flexible polyester, which is itself covered on its inner face by a layer of conductive ink. Insulating and transparent blocks insulate the plate from the polyester sheet. The activation on the touch surface produces a light depression of the polyester layer, which comes into contact with the conductive layer of the glass plate. The local contact of the two conductive layers results in a modification of the electrical current applied to the plate, corresponding to a voltage gradient.

According to another example, the contact sensor comprises flexible semiconductive layers sandwiched between, for example, a conductive layer and a resistive layer. By exerting a pressure or a dragging action on the FSR layer, its ohmic resistance decreases thus making it possible, by application of an appropriate electrical voltage, to measure the pressure applied and/or the location of the point where the pressure is exerted.

According to another example, the contact sensor is based on a capacitive technology.

The haptic feedback module 4 comprises at least one actuator (not represented) linked to the plate of the touch surface 2, to generate the haptic feedback as a function of a signal from the contact sensor. The haptic feedback is a vibratory signal such as a vibration produced by a sinusoidal control signal or by a control signal comprising a pulse or a succession of pulses, sent to the actuator. The vibration is for example directed in the plane of the touch surface 2 or orthogonally to the plane of the touch surface 2 or even directed according to a combination of these two directions.

In the case of a plurality of actuators, the latter are arranged under the touch surface 2, in different positions (at the center or on one side) or in different orientations (in the direction of the press on the surface or in another axis).

According to an exemplary embodiment, the actuator is based on a technology similar to the loudspeaker (voice coil) technology. It comprises a fixed part and a part that is translationally mobile in an air gap of the fixed part, for example of the order of 200 µm, between a first position and a second position, parallel to a longitudinal axis of the mobile part. The mobile part is for example formed by a mobile magnet sliding in a fixed coil or by a mobile coil sliding around a fixed magnet, the mobile part and the fixed part cooperating by electromagnetic effect. The mobile parts are linked to the plate in such a way that the movement of the mobile parts generates the translational movement of the plate to generate the haptic feedback to the finger of the user. This technology is easy to control and allows the displacement of great masses, like that of a screen, at various frequencies and observes the very strict motor vehicle constraints that are a low cost, a good resistance to high temperature variations, and simplicity of installation.

The control device 1 further comprises a driver unit 5 configured to drive the haptic and/or audio feedback module 4 such that the value of at least one parameter of the haptic and/or audio feedback depends on the distance D between the location of the finger of the user P1 and a target control zone Zc of the touch surface 2.

The driver unit 5 is for example configured to control a function, for example to control embedded systems of the vehicle such as the air conditioning, radio, music, telephone, cooling or navigation system, when a contact is detected in the target control zone Zc.

The haptic and/or audio feedback is thus used to guide the user in searching the target control zone Zc, which makes it possible to avoid having the driver divert his or her gaze from the road and which facilitates identification on the touch surface 2 when driving at night.

For example, the more the distance D decreases, the more the value of at least one parameter of the haptic feedback increases.

A parameter of the audio feedback can be chosen from the intensity of the volume, the phase, the frequency, the duration, the duration between two identical signals.

A parameter of the haptic feedback can be chosen from the intensity of the acceleration, the frequency, the amplitude, the duration, the duration between two identical signals, the phase.

According to a first example, the value of at least one parameter varies by levels.

Figure 2:
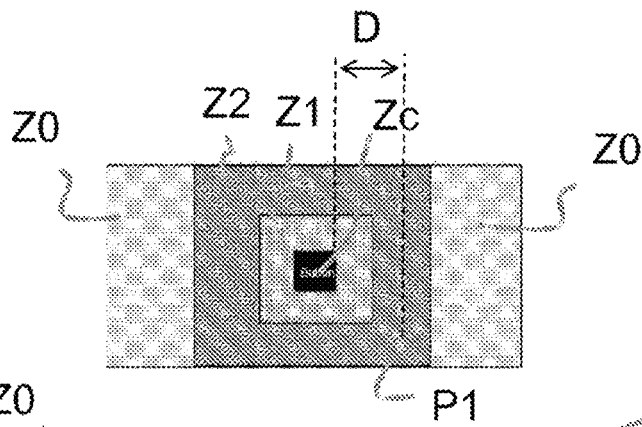
FIG. 2 represents a first example of a touch surface.

For example, and as represented in FIG. 2, provision is made for the touch surface 2 to comprise a plurality of zones in strips Z2, Z1, surrounding the target control zones Zc, concentric, and in which a haptic and/or audio feedback is generated.

Provision is also made for the value of at least one parameter of the haptic and/or audio feedback generated to be associated with a respective strip Z1, Z2.

It is also possible to provide for no haptic feedback to be generated in a zone Z0, situated beyond the zones in strips Z1, Z2, that is to say around the outer strip Z2.

Thus, each time a strip is crossed, the user perceives that his or her finger is approaching the target control zone Zc.

According to a second example, the value of at least one parameter changes according to a relationship dependent on said distance D, such as a linear relationship.

Provision is for example made for the touch surface 2 to comprise at least one corridor zone Z1, Z2, Z3, Z4, that is to say a zone of elongate form, such as rectangular, directed toward the target control zone Zc.

Figure 3:
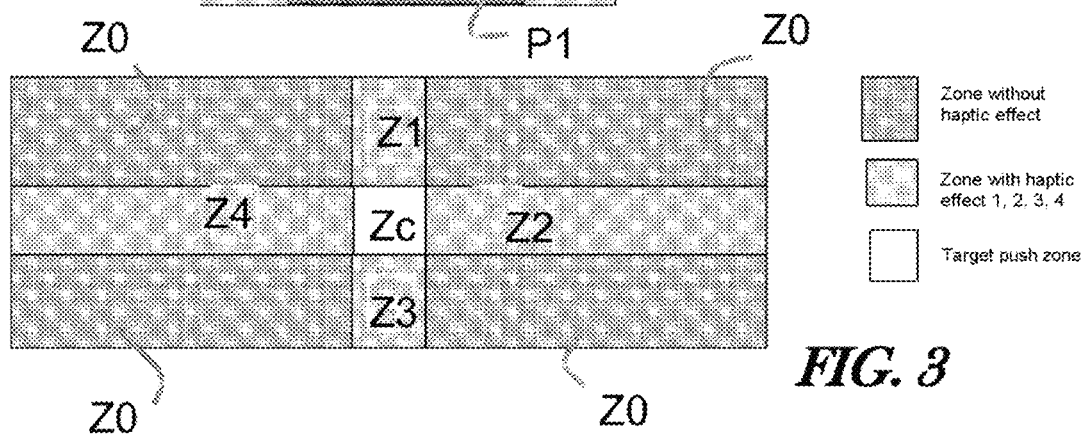
FIG. 3 represents a second example of a touch surface.

For example, and as represented in FIG. 3, provision is made for the touch surface 2 to comprise four corridors Z1, Z2, Z3, Z4 converging toward the target control zone Zc and spaced apart from one another by 90°.

Thus, the closer the user brings his or her finger to the target control zone Zc, the more the haptic feedback changes, for example the more the duration between two identical haptic signals decreases, thus causing the occurrence of the signal to increase, in the same way as reversing radars.

The invention claimed is:

1. A control device for a motor vehicle comprising:
   a touch surface for detecting a contact of a finger of a user and a location of the contact on the touch surface, the touch surface comprising a target zone, a non-haptic zone, and two corridor zones, wherein the non-haptic zone has an angle defined by two boundaries between the non-haptic zone and the two corridor zones, wherein the non-haptic zone provides no haptic feedback and no audio feedback;
   a haptic and/or audio feedback module configured to generate haptic signals, that make the touch surface vibrate and/or generate audio feedback to the user, in response to the contact being in a corridor zone among the two corridor zones on the touch surface; and
   a driver unit configured to drive the haptic and/or audio feedback module such that the corridor zone is associated with a predetermined value of at least one parameter of haptic and/or audio feedback,
   wherein the angle of the non-haptic zone points toward the target zone such that moving the finger between the two corridor zones across the non-haptic zone repetitively toward the target zone results in discontinuity of the haptic signals with repetitively decreasing separations between the haptic signals.

2. The control device as claimed in one of claim 1, wherein the value of at least one parameter varies by levels.

3. The control device as claimed in claim 1, wherein a parameter of the audio feedback is chosen from the group consisting of: an intensity of the volume, a phase, a frequency, a duration, and a duration between two identical signals, and/or a parameter of the haptic feedback is chosen from the group consisting of: an intensity of the acceleration, a frequency, an amplitude, a duration, and a duration between two identical signals, the phase.

4. A method for controlling a control device for a motor vehicle, the method comprising:
   detecting a contact of a finger of a user and a location of the contact on a touch surface, the touch surface comprising a target zone, a non-haptic zone, and two corridor zones, wherein the non-haptic zone has an angle defined by two boundaries between the non-haptic zone and the two corridor zones, wherein the non-haptic zone provides no haptic feedback and no audio feedback; and
   generating haptic signals as a haptic and/or audio feedback in response to the contact being in a corridor zone among the plurality of corridor zones, wherein the corridor zone is associated with a predetermined value of at least one parameter of haptic and/or audio feedback,
   wherein the angle of the non-haptic zone points toward the target zone such that moving the finger between the two corridor zones across the non-haptic zone repetitively toward the target zone results in discontinuity of the haptic signals with repetitively decreasing separations between the haptic signals.

5. The control method as claimed in claim 4, wherein the value of at least one parameter varies by levels.

6. The control device as claimed in claim 1, wherein the touch surface comprises a force sensing resistor (FSR) layer, wherein the FSR layer detects the contact of the finger.

7. The control device as claimed in claim 1, wherein the plurality of corridor zones are organized such that when the finger crosses a first corridor zone to a second corridor zone among the plurality of corridor zones, a change in a haptic vibration identifies that the finger is approaching the target zone.

8. The control device as claimed in claim 1, wherein the non-haptic zone is adjacent to a first edge and a second edge of the corridor zone, and wherein the target zone is adjacent to a third edge of the corridor zone.

* * * * *